United States Patent
Borlick et al.

(10) Patent No.: US 11,651,070 B2
(45) Date of Patent: *May 16, 2023

(54) USING A CHARACTERISTIC OF A PROCESS INPUT/OUTPUT (I/O) ACTIVITY AND DATA SUBJECT TO THE I/O ACTIVITY TO DETERMINE WHETHER THE PROCESS IS A SUSPICIOUS PROCESS

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/478,834

(22) Filed: Sep. 17, 2021

(65) Prior Publication Data
US 2022/0004628 A1    Jan. 6, 2022

Related U.S. Application Data

(63) Continuation of application No. 16/261,490, filed on Jan. 29, 2019, now Pat. No. 11,188,641, which is a
(Continued)

(51) Int. Cl.
*G06F 21/56*    (2013.01)
*G06F 21/55*    (2013.01)
(Continued)

(52) U.S. Cl.
CPC .............. *G06F 21/55* (2013.01); *G06F 3/067* (2013.01); *G06F 3/0622* (2013.01);
(Continued)

(58) Field of Classification Search
CPC ...... G06F 21/55; G06F 3/0622; G06F 3/0653; G06F 3/067; G06F 21/566; G06F 21/78;
(Continued)

(56) References Cited

U.S. PATENT DOCUMENTS 6,405,318 B1    6/2002    Rowland
7,464,246 B2    12/2008    Gill et al.
(Continued)

OTHER PUBLICATIONS

Kharraz et al. "Cutting the Gordian Knot: A Look Under the Hood of Ransomware Attacks" dated 2015, International Conference on Detection of Intrusions and Malware, and Vulnerability Assessment. Springer International Publishing, Total 20 pages.
(Continued)

*Primary Examiner* — Ali S Abyaneh
(74) *Attorney, Agent, or Firm* — Konrad Raynes Davda & Victor LLP; David W. Victor

(57) ABSTRACT

Provided are a computer program product, system, and method for detecting a security breach in a system managing access to a storage. Process Input/Output (I/O) activity by a process accessing data in a storage is monitored. A determination is made of a characteristic of the data subject to the I/O activity from the process. A determination is made as to whether a characteristic of the process I/O activity as compared to the characteristic of the data satisfies a condition. The process initiating the I/O activity is characterized as a suspicious process in response to determining that the condition is satisfied. A security breach is indicated in response to characterizing the process as the suspicious process.

20 Claims, 6 Drawing Sheets

US 11,651,070 B2

Page 2

Related U.S. Application Data continuation of application No. 15/482,530, filed on Apr. 7, 2017, now Pat. No. 10,248,577.

(51) Int. Cl.
- H04L 9/40 (2022.01)
- G06F 21/78 (2013.01)
- G06F 3/06 (2006.01)

(52) U.S. Cl.
CPC .......... G06F 3/0653 (2013.01); G06F 21/566 (2013.01); G06F 21/78 (2013.01); H04L 63/145 (2013.01); H04L 63/1416 (2013.01); H04L 63/1425 (2013.01)

(58) Field of Classification Search
CPC .. H04L 63/1416; H04L 63/145; H04L 63/142
See application file for complete search history.

(56) References Cited

U.S. PATENT DOCUMENTS

| | | | |
|---|---|---|---|
| 7,962,959 | B1 | 6/2011 | Batenin |
| 8,532,610 | B2 | 9/2013 | Manning Cassett et al. |
| 9,292,687 | B2 | 3/2016 | Thure et al. |
| 9,317,686 | B1 | 4/2016 | Ye et al. |
| 9,319,423 | B2 | 4/2016 | Jover et al. |
| 9,734,337 | B1* | 8/2017 | Patton ................... G06F 21/568 |
| 10,248,577 | B2 | 4/2019 | Borlick et al. |
| 10,282,543 | B2 | 5/2019 | Borlick et al. |
| 10,445,497 | B2 | 10/2019 | Borlick et al. |
| 10,592,659 | B2* | 3/2020 | Cudak ..................... G06F 21/50 |
| 2003/0159090 | A1 | 8/2003 | Wray et al. |
| 2005/0022093 | A1 | 1/2005 | Murakoshi |
| 2007/0118695 | A1 | 5/2007 | Lowe et al. |
| 2008/0021853 | A1 | 1/2008 | Modha et al. |
| 2011/0296525 | A1 | 12/2011 | Turbin |
| 2014/0237596 | A1* | 8/2014 | Grytsan ................ G06F 21/566 726/23 |
| 2014/0310800 | A1 | 10/2014 | Kabra et al. |
| 2015/0215325 | A1* | 7/2015 | Ogawa ................ H04L 63/1425 726/23 |
| 2016/0215325 | A1 | 7/2016 | Kshirsagar et al. |
| 2016/0275294 | A1 | 9/2016 | Irvine |
| 2016/0378691 | A1* | 12/2016 | Sherman .................... G06F 3/06 711/163 |
| 2017/0208092 | A1* | 7/2017 | Ochse ................. H04L 63/1416 |
| 2017/0244729 | A1* | 8/2017 | Fahrny ................ H04L 63/0823 |
| 2018/0007074 | A1* | 1/2018 | Kune ........................ H04Q 9/00 |
| 2018/0018456 | A1* | 1/2018 | Chen ..................... G06F 21/552 |
| 2018/0075239 | A1 | 3/2018 | Boutnaru |
| 2018/0159866 | A1 | 6/2018 | Sheri et al. |
| 2018/0293176 | A1 | 10/2018 | Borlick et al. |
| 2018/0322280 | A1 | 11/2018 | Borlick et al. |
| 2018/0322281 | A1 | 11/2018 | Borlick et al. |
| 2019/0155751 | A1 | 5/2019 | Borlick et al. |
| 2019/0205536 | A1 | 7/2019 | Borlick et al. |
| 2019/0332768 | A1 | 10/2019 | Borlick et al. |

OTHER PUBLICATIONS

Mbol et al., "An Efficient Approach to Detect Torrentlocker Ransomware in Computer Systems." dated 2016, International Conference on Cryptology and Network Security. Springer International Publishing, Total 10 pages.

Scaife et al. "CryptoLock (and Drop It): Stopping Ransomware Attacks on User Data" dated 2016, Distributed Computing Systems (ICDCS), 2016 IEEE 36th International Conference on. IEEE, Total 10 pages.

Song et al., "The Effective Ransomware Prevention Technique Using Process Monitoring on Android Platform." dated 2016, Mobile Information Systems 2016, Total 10 pages.

Sgandurra et al. "Automated Dynamic Analysis of Ransomware: Benefits, Limitations and Use for Detection." dated 2016, Department of Computing, Total 12 pages.

Ljubuncic, Problem-solving in High Performance Computing: A Situational Awareness Approach with Linux. Morgan Kaufmann, 2015, pp. 1 (Citing provided description).

R. Gunasekaran et al. "Real-Time System Log Monitoring/Analytics Framework" dated 2011, Proceedings of the Characterizing Applications for Heterogeneous Exascale Systems (CACHES'11), Total 9 pages.

R. Gunasekaran et al. "Characterizing Application Runtime Behavior from System Logs and Metrics Raghul" dated 2011, Proceedings of the Characterizing Applications for Heterogeneous Exascale Systems (CACHES'11) Total 7 pages.

R. Loui, et al., "Digital Flight Plans for Server Access Control: Restricting anomalous activity with path-based declarations of intentions", University of Illinois, Springfield, date not available, Total 6 pages.

E. Marilly et al. "Alarm correlation for complex telecommunication networks using neural networks and signal processing." dated 2002, IP Operations and Management, 2002 IEEE Workshop on. IEEE, Total 5 pages.

A. Oliner et al., "Alert detection in system logs." dated 2008, Eighth IEEE International Conference on Data Mining. IEEE, Total 6 pages.

Wikipedia, "Antivirus Software", [online] [retrieved Mar. 26, 2017] https://en.wikipedia.org/wiki/Antivirus_software, Total 10 pages.

List of Patents and Applications Treated as Related, dated Sep. 17, 2021, Total 2 pages.

US Patent Application, dated May 3, 2017, for U.S. Appl. No. 15/585,997, filed May 3, 2017, Total 33 pages.

Notice of Allowance dated Dec. 28, 2018, for U.S. Appl. No. 15/585,997, filed May 3, 2017, Total 33 pages.

US Patent Application, dated Jun. 4, 2019, for U.S. Appl. No. 16/292,306, filed Mar. 4, 2019, Total 33 pages.

Preliminary Amendment dated Mar. 4, 2019, for U.S. Appl. No. 16/292,306, filed Mar. 4, 2019, Total 9 pages.

Office Action, dated Apr. 10, 2020, for U.S. Appl. No. 16/292,306, filed Mar. 4, 2019, Total 29 pages.

Response to Office Action, dated Jul. 10, 2020, for U.S. Appl. No. 16/292,306, filed Mar. 4, 2019, Total 13 pages.

Final Office Action, dated Oct. 14, 2020, for U.S. Appl. No. 16/292,306, filed Mar. 4, 2019, Total 25 pages.

Response to Final Office Action, dated Dec. 14, 2020, for U.S. Appl. No. 16/292,306, filed Mar. 4, 2019, Total 12 pages.

Response to Final Office Action, dated Dec. 31, 2020, for U.S. Appl. No. 16/292,306, filed Mar. 4, 2019, Total 12 pages.

Office Action3, dated Mar. 29, 2021, for U.S. Appl. No. 16/292,306, filed Mar. 4, 2019, Total 23 pages.

Response to Office Action3 dated May 20, 2021, for U.S. Appl. No. 16/292,306, filed Mar. 4, 2019, Total 12 pages.

Supplmental Amendment dated May 27, 2021, for U.S. Appl. No. 16/292,306, filed Mar. 4, 2019, Total 9 pages.

Notice of Allowance, dated Jun. 10, 2021, for U.S. Appl. No. 16/292,306, filed Mar. 4, 2019, Total 14 pages.

US Patent Application, dated Apr. 7, 2017, for U.S. Appl. No. 15/482,530, filed Apr. 7, 2017, Total 34 pages.

Notice of Allowance dated Nov. 20, 2020, for U.S. Appl. No. 15/482,530, filed Apr. 7, 2017, Total 43 pages.

US Patent Application, dated Jan. 29, 2019, for U.S. Appl. No. 16/261,490, filed Jan. 29, 2019, Total 34 pages.

Preliminary Amendment, dated Jan. 29, 2019, for U.S. Appl. No. 16/261,490, filed Jan. 29, 2019, Total 9 pages.

Office Action1, dated Sep. 24, 2020, for U.S. Appl. No. 16/261,490, filed Jan. 29, 2019, Total 37 pages.

Response to Office Action1, dated Dec. 6, 2020, for U.S. Appl. No. 16/261,490, filed Jan. 29, 2019 Total 12 pages.

Final Office Action1, dated Feb. 25, 2021, for U.S. Appl. No. 16/261,490, filed Jan. 29, 2019, Total 21 pages.

Notice of Allowance, dated Jun. 30, 2021, for U.S. Appl. No. 16/261,490, filed Jan. 29, 2019, Total 21 pages.

US Patent Application, dated May 3, 2017 for U.S. Appl. No. 15/586,039, invented by Matthew Borlick et al., filed May 3, 2017, Total 42 pages.

(56) References Cited

OTHER PUBLICATIONS

Notice of Allowance dated May 20, 2019, for U.S. Appl. No. 15/586,039, invented by Matthew Borlick et al., filed May 3, 2017, Total 32 pages.
US Patent Application, for U.S. Appl. No. 16/508,294, filed Jul. 10, 2019, Total 42 pages.
Preliminary Amendment dated Jul. 10, 2019, for U.S. Appl. No. 16/508,294, filed Jul. 10, 2019, Total 8 pages.
Office Action1, dated Mar. 18, 2020, for U.S. Appl. No. 16/508,294, filed Jul. 10, 2019, Total 16 sages.
Response to Office Action, dated Jun. 18, 2020, for U.S. Appl. No. 16/508,294, filed Jul. 10, 2019, Total 11 pages.
Notice of Allowance1, dated Jul. 23, 2020, for U.S. Appl. No. 16/508,294, filed Jul. 10, 2019, Total 20 pages.
Notice of Allowance2, dated Nov. 16, 2020, for U.S. Appl. No. 16/508,294, filed Jul. 10, 2019, Total 16 pages.
Notice of Allowance3, dated Mar. 11, 2021, for U.S. Appl. No. 16/508,294, filed Jul. 10, 2019, Total 7 pages.
Notice of Allowance4, dated May 20, 2021, for U.S. Appl. No. 16/508,294, filed Jul. 10, 2019, Total 14 pages.

\* cited by examiner

USING A CHARACTERISTIC OF A PROCESS INPUT/OUTPUT (I/O) ACTIVITY AND DATA SUBJECT TO THE I/O ACTIVITY TO DETERMINE WHETHER THE PROCESS IS A SUSPICIOUS PROCESS

BACKGROUND OF THE INVENTION

1. Field of the Invention

The present invention relates to a computer program product, system, and method for using a characteristic of a process I/O activity and data subject to the i/o activity to determine whether the process is a suspicious process.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software.

There is a need in the art for improved techniques for detecting suspicious processes potentially having malware so that such processes can then be managed to prevent malevolent activity and compromising data.

SUMMARY

Provided are a computer program product, system, and method for detecting a security breach in a system managing access to a storage. Process Input/Output (I/O) activity by a process accessing data in a storage is monitored. A determination is made of a characteristic of the data subject to the I/O activity from the process. A determination is made as to whether a characteristic of the process I/O activity as compared to the characteristic of the data satisfies a condition. The process initiating the I/O activity is characterized as a suspicious process in response to determining that the condition is satisfied. A security breach is indicated in response to characterizing the process as the suspicious process.

With the above embodiment, a characteristic of the I/O activity and a characteristic of the data subject to the I/O activity are compared to determine if a condition is satisfied. Satisfying the condition for the compared characteristic is indicative of I/O activity of malicious code. For instance, malicious code may exhibit certain I/O activity characteristics with respect to characteristics of the data, and if a process exhibits I/O activity satisfying a condition with respect to a characteristic of data indicative of malicious code, than that process is characterized as suspicious activity and a security breach indicated. With such embodiments, malicious code is determined based on the behavior or characteristics of the I/O activity and the characteristic of the data being accessed, not just the content of the code. Further with the described embodiment, both the characteristic of the process I/O activity and data are considered, because a characteristic of the data may determine whether a specific I/O activity characteristic is indicative that the process initiating the I/O activity is a suspicious process. Described embodiments improve the success of behavioral analysis of processes for malevolent purposes by considering the context of the data the process is operating upon.

In a further embodiment, the characteristic of the data comprises a first characteristic of the data and the characteristic of the process I/O activity comprises a first characteristics of the process I/O activity. In response to determining that the first characteristic of the I/O activity as compared to the first characteristic of the data satisfies a first condition, a determination is made of a second characteristic of the data subject to the I/O activity from the process. A determination is made as to whether a second characteristic of the process I/O activity as compared to the second characteristic of the data satisfies a second condition. The process initiating the process I/O activity is indicated as the suspicious process in response to determining that the second condition is satisfied.

With the above embodiment, multiple conditions with respect to different characteristics of the I/O activity and the data must be satisfied before classifying the process as a suspicious process. The different characteristics of the I/O activity and the data may relate to different characteristics that independently indicate I/O activity observed as occurring with malicious processes. Requiring that multiple conditions be satisfied with respect to different characteristics of the I/O activity and the data reduces the likelihood of mischaracterizing a valid process as suspicious.

A further embodiment comprises a computer program product, system, and method for detecting a security breach in a system managing access to a storage. Process Input/Output (I/O) activity by a process accessing data in a storage is monitored. A determination is made of historical I/O activity of the data subject to the process I/O activity from the process. A determination is made as to whether the process I/O activity exceeds the historical I/O activity by a threshold. The process initiating the I/O activity is characterized as a suspicious process in response to determining that the process I/O activity exceeds the historical I/O activity by the threshold. A security breach is indicated in response to characterizing the process as the suspicious process.

With the above embodiment, a process is identified as suspicious when the process has I/O activity that exceeds the historical I/O activity of the data being accessed by a threshold indicative of a malicious process. This allows classification of a suspicious process and security breach based on both the process I/O activity, the historical I/O activity of the data being accessed, and a recognized threshold to allow classification based on the behavior of the code, not just the content of the code.

In a further embodiment, the historical I/O activity comprises a peak I/O rate for a time period during which an I/O rate of data access during the time period was a highest I/O rate and the process I/O activity comprises a process I/O rate of the process I/O activity. The determining whether the process I/O activity exceeds the historical I/O activity by the threshold comprises determining whether the process I/O rate exceeds the peak I/O rate by the threshold.

With the above embodiment, a determination is made whether the I/O rate of the process exceeds a peak I/O rate for the data. If the process is exceeding the peak or highest I/O rate for the data by a threshold, then such high rate of access is typical of malicious processes. This allows a suspicious process to be identified based on the I/O rate of the process versus a historical I/O rate of the data, to allow classification of a suspicious process without having to analyze the content of the code of the process with respect to virus definition files.

In a further embodiment, the peak I/O rate comprises an average peak I/O rate of peak I/O rates measured during samples of the time period. The determining the historical I/O activity comprises determining a standard deviation of the peak I/O rates during the samples of the time period. The threshold comprises a predetermined number of the standard deviation. The threshold is exceeded in response to determining that the process I/O rate exceeds the peak I/O rate by the predetermined number of the standard deviation.

With the above embodiment, the condition is satisfied if the process I/O rate exceeds the peak I/O rate for the data by a number of the standard deviation of the peak I/O data, which indicates that the probability that the process I/O rate falls within normal peak I/O rate levels is highly unlikely. This is further indicative that the process I/O activity is for a suspicious process as malicious code is observed to be associated with higher I/O rates.

A further embodiment comprises a computer program product, system, and method for detecting a security breach in a system managing access to a storage. Process Input/Output (I/O) activity by a process accessing data in a storage is monitored and a determination is made of a timestamp when the data subject to the I/O activity was last accessed. A determination is made as to whether a difference of a process access time at which the process is accessing the data and the timestamp exceeds a threshold. The process initiating the I/O activity is characterized as a suspicious process in response to determining that the difference of the process access time and the timestamp exceeds the threshold. A security breach is indicated in response to characterizing the process as the suspicious process.

With the above embodiment, a determination is made as to whether the time since the data being accessed by the process I/O activity was last accessed exceeds a threshold. This allows a suspicious process to be identified based on the frequency at which the data is accessed because malicious processes have been observed to access data not having been accessed for an extended period. This allows classification of a suspicious process based on the characteristic of the data being accessed.

DETAILED DESCRIPTION

Anti-malware software identifies security threats and potential malicious processes, and then may block access to data subject to the security threat until the security threat is resolved. Described embodiments provide techniques to determine whether a process initiating I/O activity with respect to data is a suspicious process potentially having malicious code based on one or more characteristics of Input/Output I/O activity being initiated by the monitored process and the data subject to the activity. For instance, one characteristic considered may comprise an I/O rate, such as a comparison of whether the I/O rate of the I/O activity of the monitored process exceeds a peak I/O rate for the accessed data by a threshold, such as a number of standard deviations of the measured peak I/O rate. Another characteristic to consider may comprise a last time the data subject to the I/O activity of the monitored process was accessed.

The considered characteristics of the process I/O activity and the data being accessed comprise characteristics that are empirically observed as typical of malicious code. For instance, malicious code, such as ransomware, may access a large amount of data at a faster than normal rate to encrypt as much data as possible, thus resulting in an I/O rate that exceeds a peak I/O rate for data in the system by a substantial amount. Further, malicious code, such as ransomware or other viruses, may attempt to access all data in the system, including data not accessed in a long time. If these characteristics of the I/O activity exceeds the same characteristics with respect to the data being accessed, such as I/O rate, time of access, etc., by a threshold amount, then such detected conditions may indicate that the monitored process comprises a suspicious process potentially having malicious code.

Described embodiments thus flag processes as being suspicious based on the behavior of the process as well as characteristics of the data, because the context of the data being accessed may determine whether the process is acting in a manner indicative of malicious code. For instance, a process having an apparent high I/O rate may not in fact indicate malicious code if the data being accessed has a high peak I/O rate. Described embodiments are advantageous over malware identification techniques that analyze the code, which are process intensive and require use of large virus definition files that need to be constantly updated.

Figure 1:
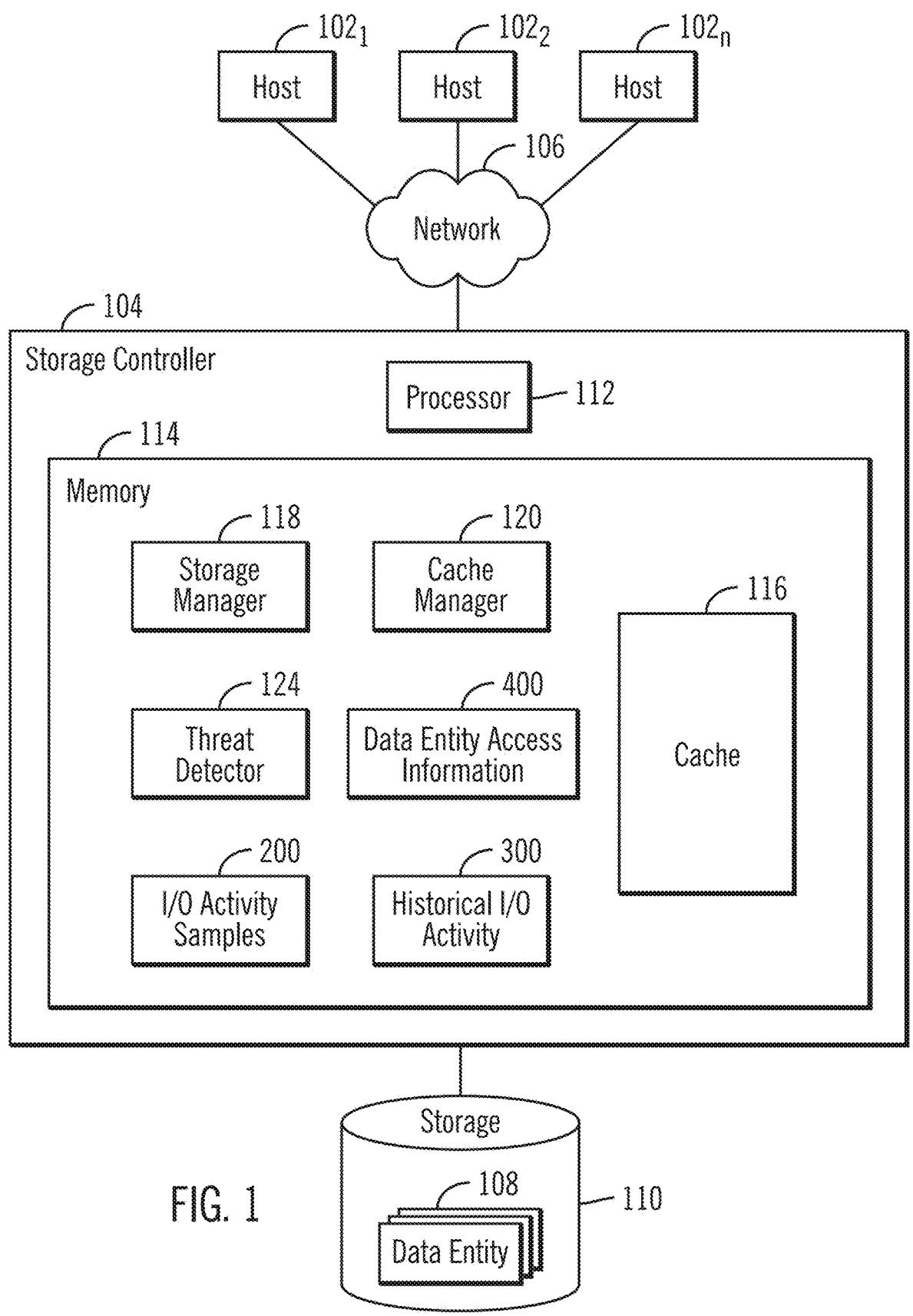
FIG. 1 illustrates an embodiment of a computing environment.

FIG. 1 illustrates an embodiment of a computing environment. A plurality of hosts $102_1, 102_2 \ldots 102_n$ may submit Input/Output (I/O) requests to a storage controller 104 over a network 106 to access data entities 108 (e.g., Volumes, Logical Unit Numbers, Logical Devices, Logical Subsystems, data sets, extents of data, data objects, databases, etc.) in a storage 110. The storage controller 104 includes one or more processors 112 and a memory 114, including a cache 116 to cache data for the storage 110. The processor 112 may comprise a separate central processing unit (CPU), one or a group of multiple cores on a single CPU, or a group of processing resources on one or more CPUs. The cache 116 buffers data transferred between the hosts $102_1, 102_2 \ldots 102_n$ and data entities 108 in the storage 110.

The memory 114 includes a storage manager 118 for managing the transfer of tracks transferred between the hosts $102_1, 102_2 \ldots 102_n$ and the storage 110 and a cache manager 120 that manages data transferred between the hosts $102_1, 102_2 \ldots 102_n$ and the storage 110 in the cache 116. A track may comprise any unit of data configured in the storage 110, such as a track, Logical Block Address (LBA), storage cell, group of cells (e.g., column, row or army of cells), sector, segment, etc., which may be part of a larger grouping of tracks, such as a volume, logical device, etc.

The memory 114 further includes a threat detector 124 to detect suspicious processes that potentially have malicious code, such as a virus, ransomware, etc. based on historical Input/Output (I/O) activity 300 and/or data entity access information 400. The historical I/O activity 300 is generated from I/O activity samples 200 comprising measurements of I/O activity toward the data entities 108 at different time periods, such as peak I/O rates at different time periods, e.g., a portion of a larger time period (e.g., a segment of a day).

The I/O activity samples 200 are measured at different sample time periods of a lager time period. For instance, the sample time periods may comprise portions of a larger time period comprising a day, such as portions of a day, daytime versus nighttime. Alternatively, the sampled time periods may comprise days measured for a larger time period such as a week or month, or the sampled time periods can comprise minute segments of an hour, etc. The samples 200 provide data for the sampled time periods over multiple instances of the larger time periods.

The storage manager 118, cache manager 120, and threat detector 124 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1$, $102_2$ . . . $102_n$ may connect to the storage controller 104 over a bus interface, such as a Peripheral Component Interconnect (PCI) bus interface and other interfaces known in the art.

Figure 2:
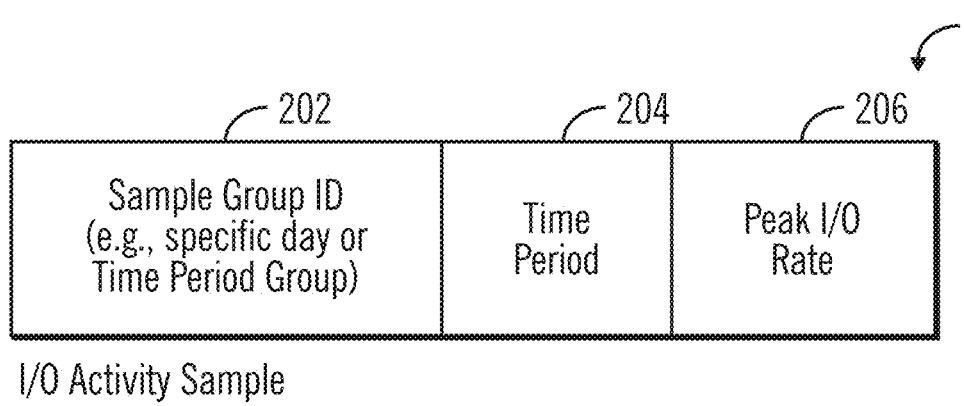
FIG. 2 illustrates an embodiment of an Input/Output (I/O) activity sample.

FIG. 2 illustrates an embodiment of an instance of an I/O activity sample $200_i$ comprising a sample group identifier (ID) 202, such as an identifier of a larger time period during which the samples are measured, such as a specified day, week, month, etc.; a time period 204 for which the sample was measured, where there may be multiple time periods 204 within a larger sample group or larger time period, such as portions of a day within a day, days within a week, etc. and a peak I/O rate 206 comprising the highest I/O rate that occurred during the time period 204, such as measured as a data transfer rate.

Figure 3:
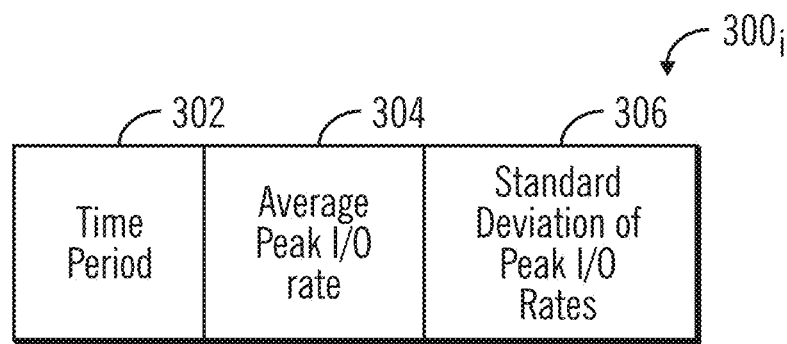
FIG. 3 illustrates an embodiment of historical I/O activity information.

FIG. 3 illustrates an embodiment of an instance of historical I/O activity $300_i$ for a time period calculated from the I/O activity samples $200_i$ for the time period, and includes a time period 302 of the larger period for which the I/O activity samples 200 are gathered; an average peak I/O rate 304 calculated during the time period 302 from the samples $200_i$ for that time period 302; and a standard deviation 306 of the peak I/O rates in the I/O activity samples $200_i$ for the time period 302. There may comprise different historical I/O activity, such as different average peak I/O rates 304 and standard deviations 306, for different time periods measured for the larger time period.

Figure 4:
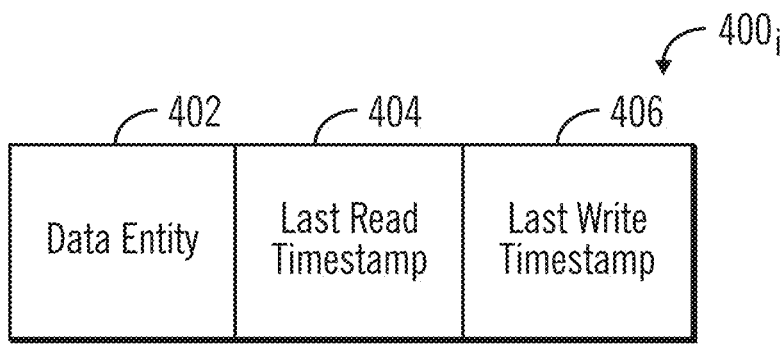
FIG. 4 illustrates an embodiment of data entity access information.

FIG. 4 illustrates an embodiment of an instance of data entity access information $400_i$ for a specified data entity 402 and indicates a last read timestamp 404 indicating a time of a last read to the data entity 402 and a last write timestamp 406 indicating a time of a last write to the data entity 402.

Figure 5:
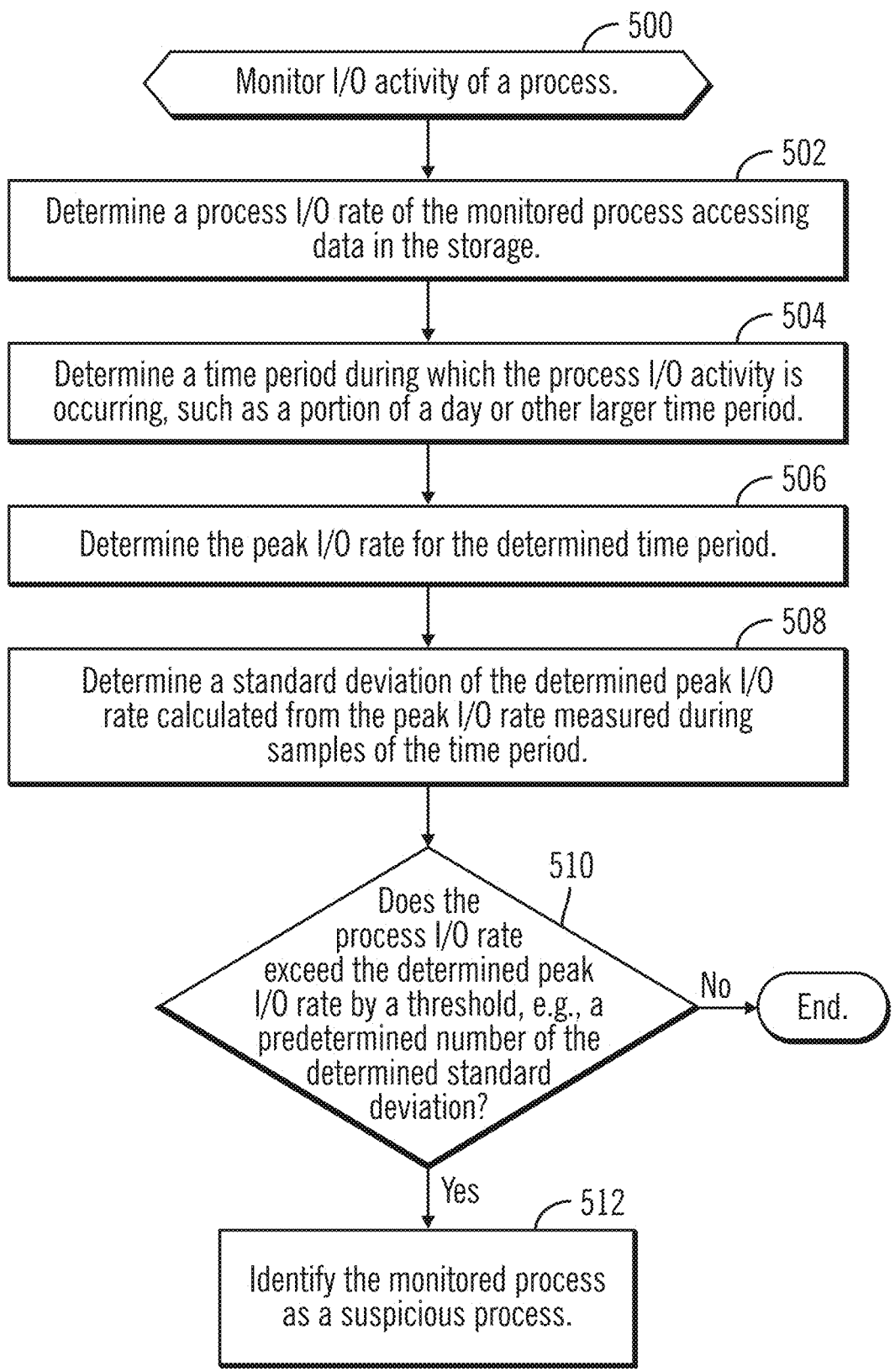
FIG. 5 illustrates an embodiment of operations to determine whether a process comprises a suspicious process based on I/O rate characteristics.

FIG. 5 illustrates an embodiment of operations performed by the threat detector 124 to determine whether a process is suspicious in potentially having malicious code that considers the historical I/O activity 300, such that a process is deemed suspicious if the process I/O activity exceeds historical I/O activity by a threshold. Such a test is based on the empirical observation that malicious code tends to perform a much larger amount of accesses of data, such as ransomware trying to encrypt all the data sets in a volume or a virus trying to corrupt or steal large amounts of data. Upon initiating an operation (at block 500) to monitor the I/O activity of a process, the threat detector 124 determines (at block 502) a process I/O rate of the monitored process accessing data in the storage 110, where the I/O rate may comprise a transfer rate of accessing data, e.g., read or written, for a unit of time, e.g., megabytes or gigabytes per second. A determination is made (at block 504) of a time period during which the process I/O activity is occurring, such as a portion of a day or other time period segment. The average peak I/O rate 304 for the time period 302 is determined (at block 506) from the historical I/O activity instance $300_i$ for the determined time period. A standard deviation 306 for the determined peak I/O rate 304 is determined (at block 508) from the peak I/O rates 206 measured during samples $200_i$ of the time period.

If (at block 510) the process I/O rate exceeds the determined peak I/O rate 304 by a threshold, such as a predetermined number of the determined standard deviation 306 for the average peak I/O rate 304 for the determined time period 302, then the monitored process is identified (at block 512) as a suspicious process. If (at block 510) the process I/O rate does not exceed the threshold, e.g., predetermined number of standard deviations, then the process I/O rate is determined not to be sufficiently large so as to warrant considering the monitored process as a suspicious process possibly comprising malicious code.

Figure 6:
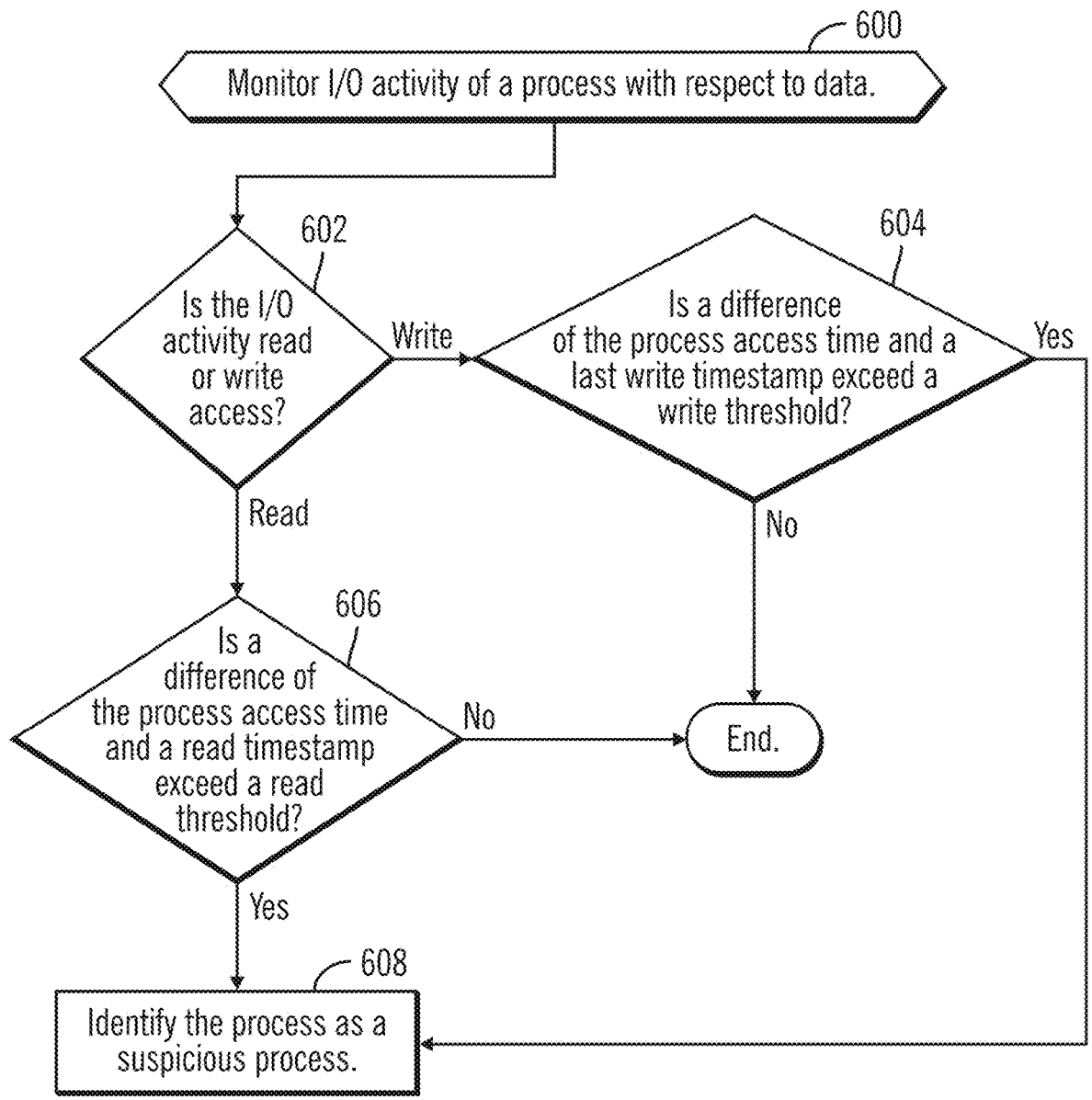
FIG. 6 illustrates an embodiment of operations to determine whether a process comprises a suspicious process based on data access time characteristics.

FIG. 6 illustrates an embodiment of operations performed by the threat detector 124 to determine whether a process is suspicious in potentially having malicious code that considers the last time a data entity including the data accessed by the process was accessed, such that a process is deemed suspicious if the process accesses data entities that have not been accessed in a threshold time. This classification as suspicious is based on the empirical Observation that malicious code tends to access all data, including data that has not been accessed in a long time, than non-malevolent processes. Upon initiating an operation (at block 600) to monitor the I/O activity of a process, the threat detector 124 determines (at block 602) whether the I/O activity is a read or write access. If a write, then the threat detector 124 determines (at block 604) whether a difference of the process access time and a last write timestamp 406 exceed a write threshold. If so, then the monitored process is identified (at block 608) as a suspicious process. Otherwise, if (at block 604) the difference of when the data entity was last written does not exceed a threshold, i.e., is not too long, then control ends without the monitored process being designated a suspicious process.

If (at block 602) the I/O activity of the monitored process comprises a read, then the threat detector 124 determines (at block 606) whether a difference of the process access time and a last read timestamp 404 for the accessed data entity 402 exceeds a read threshold. If so, then the monitored process is identified (at block 608) as a suspicious process. Otherwise, if the difference of when the data entity was last read does not exceed a read threshold, i.e., is not too long, then control ends without the monitored process being designated a suspicious process.

Figure 7:
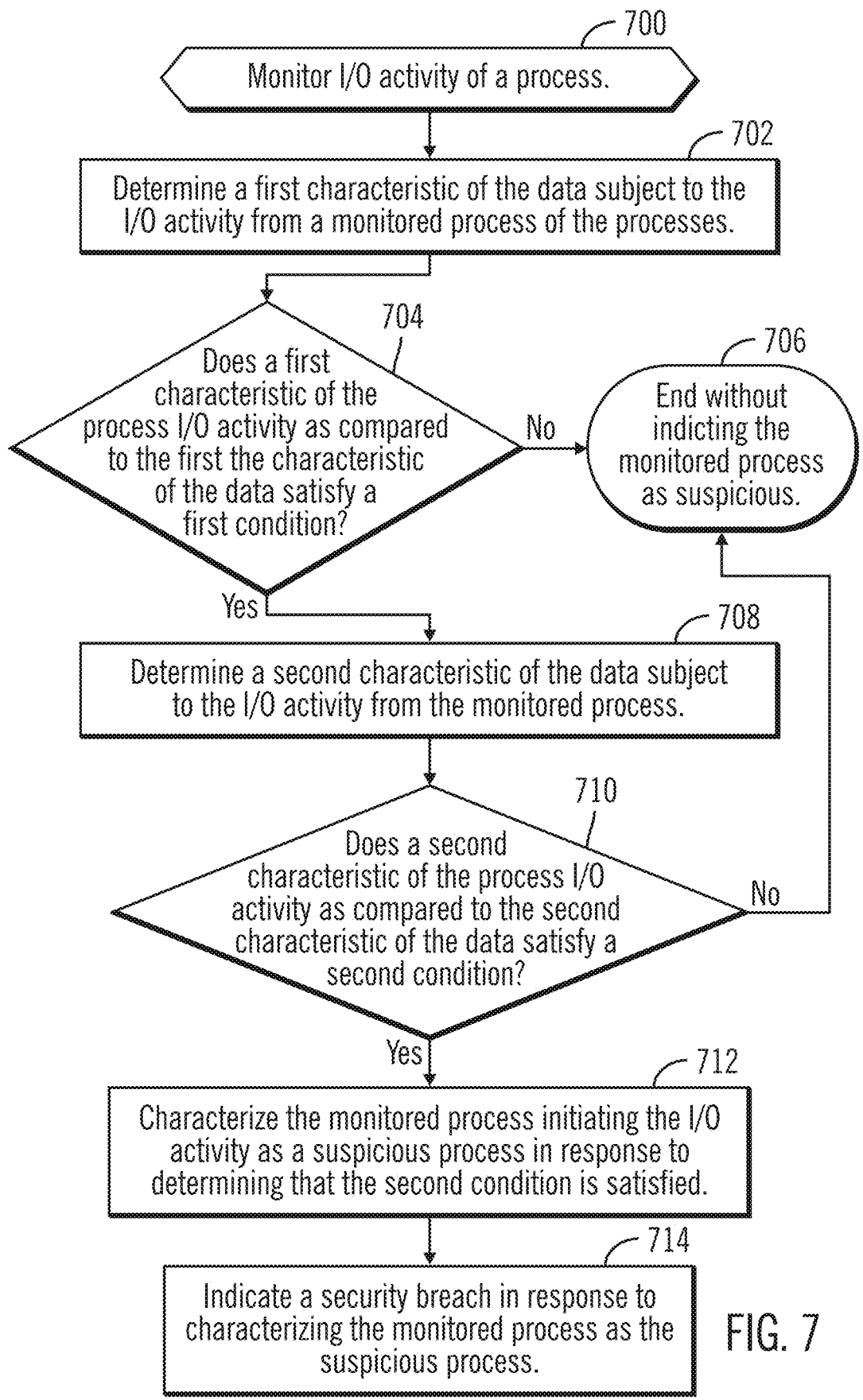
FIG. 7 illustrates an embodiment of operations to determine whether a process comprises a suspicious process based on a plurality of different characteristics of the I/O activity and data subject to the I/O activity by the process.

FIG. 7 illustrates an embodiment of operations performed by the threat detector 124 to determine whether a process is suspicious in potentially having malicious code that requires at least two conditions to be satisfied, such as a historical I/O activity pattern, as with FIG. 5, or a recentness of access, as with FIG. 6, or other characteristics that may be considered, such as characteristics that tend to indicate a process comprises malicious code. Upon monitoring (at block 700) the I/O activity of a process, a determination is made (at block 702) of a first characteristic of the data subject to the I/O activity from a monitored process. The first characteristic may comprise one of the historical I/O activity, a time of last access or another characteristic indicating malicious code. If (at block 704) a first characteristic of the process I/O activity as compared to the first the characteristic of the data does not satisfy a condition, then control ends (at block 706) without indicating the process as suspicious. If the condition (at block 704) is satisfied, then the threat detector 124 proceeds to consider an additional condition and determines (at block 708) a second characteristic of the data subject to the I/O activity from the monitored process. The second characteristic is different from the first characteristics and may comprise one of the historical I/O activity, a time of last access or another characteristic. If (at block 710) a second characteristic of the process I/O activity as compared to the second characteristic of the data does not satisfy a condition, then control ends (at block 706) without indicating the process as suspicious. Otherwise, if (at block 710) the condition is satisfied, then the threat detector 124 characterizes (at block 712) the monitored process initiating the I/O activity as a suspicious process. Further, a security breach is indicated (at block 714). At this point, a threat manager may take actions to limit the operations of the identified suspicious activity to prevent malicious operations.

With the described embodiments of FIG. 7 at least two conditions known to indicate a process as potentially having malicious code must be satisfied before the process is deemed to be a suspicious process suspected of having malicious code. After the process is deemed suspicious, then actions may be taken to restrict that processes access to data or protect data from being modified by that suspicious process. Two conditions reduce the likelihood of overclassifying processes as suspicious, i.e., too many false positives For instance the first and the second characteristics of the data subject to the I/O activity are different and each may comprise a peak I/O rate during a time period which an I/O rate of data access during the time period was a highest I/O rate and a timestamp when the data was last accessed. Other characteristics and tests may also be used based on an attribute of the data and I/O activity that when determined to exceed a threshold is indicative of malicious code. In this way, the two conditions of FIG. 7 may comprise the checks of FIGS. 5 and 6 combined, in either order. For instance, the first characteristic of the process I/O activity comprises a process I/O rate of the process I/O activity when the first characteristic of the data comprises a peak I/O rate or the first characteristic of the process I/O activity comprises a process access time at which the process is accessing the data when the first characteristic comprises the timestamp. The second characteristic of the process I/O activity comprises the process access time at which the process is accessing the data when the second characteristic comprises the timestamp or the second characteristic of the process I/O activity comprises a process I/O rate of the process I/O activity when the second characteristic of the data comprises a peak I/O rate.

In further embodiments, additional checking operations with respect to further characteristics may be performed beyond the two characteristics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting, data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
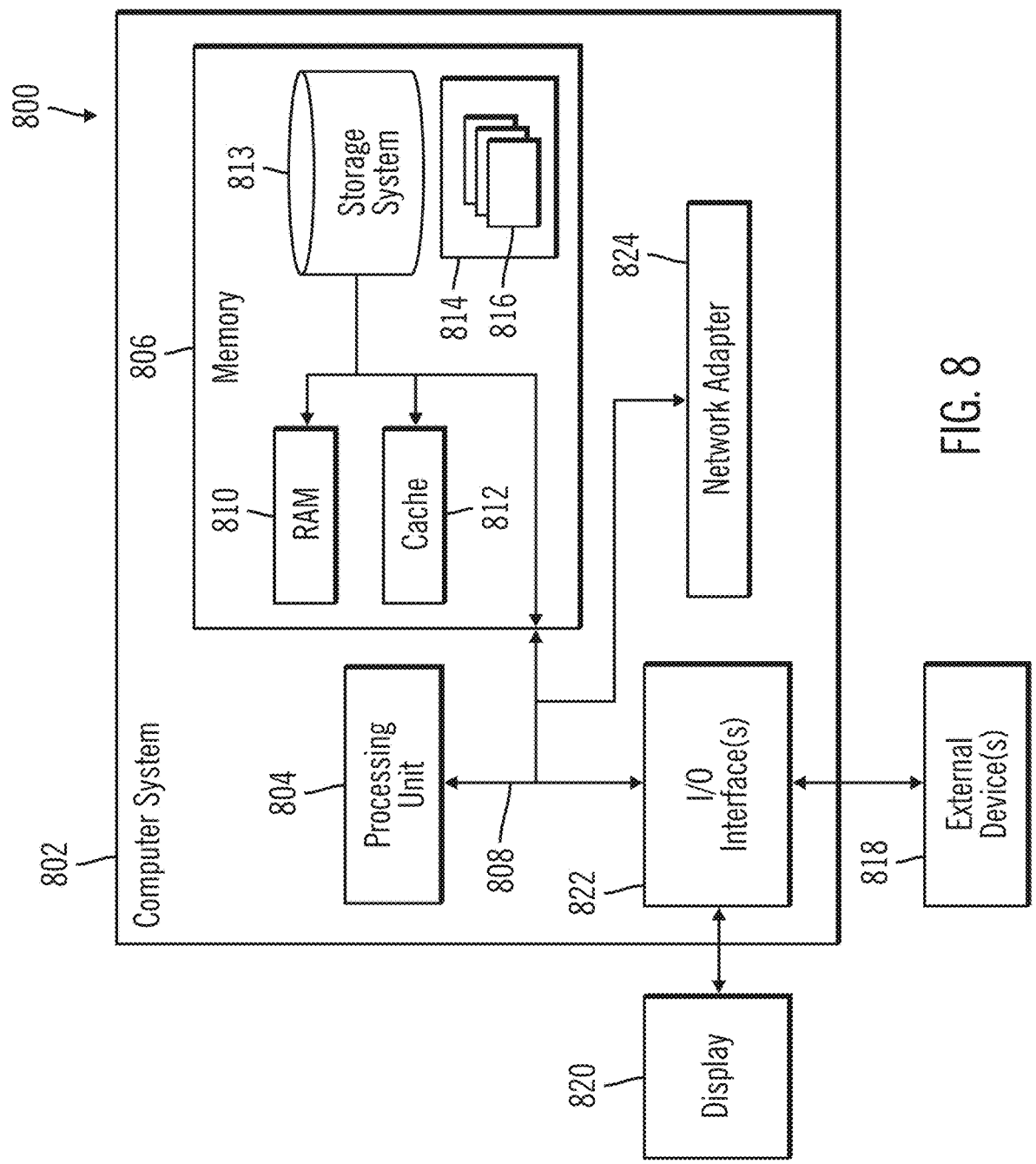
FIG. 8 illustrates a computing environment in which the components of FIG. 1 may be implemented

The computational components of FIG. 1, including the hosts $102_1, 102_2 \ldots 102_n$ and storage controller 104, may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824, As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting a security breach in a system managing access to a storage, the computer program product comprising a computer readable storage medium having computer readable program code embodied therein that when executed performs operations, the operations comprising:
   monitoring Input/Output (I/O) activity by a process accessing data in a storage;
   determining a last access time the data subject to the monitored I/O activity was last accessed prior to being accessed by the monitored I/O activity;
   determining whether a difference of a process access time the monitored I/O activity accessed the data and the last access time for the data satisfies a condition;
   characterizing the process as a suspicious process in response to determining that the condition is satisfied; and
   indicating a security breach in response to characterizing the process as the suspicious process.

2. The computer program product of claim 1, wherein the condition comprises determining whether the difference exceeds a threshold, wherein the process is characterized as the suspicious process if the difference exceeds the threshold.

3. The computer program product of claim 1, wherein the monitoring is performed with respect to a plurality of data entities in the storage, wherein the operations further comprise:
   storing, for the data entities, last access times the data entities were last accessed, wherein the determined last access time comprises a last access time for a data entity to which the monitored I/O activity is directed.

4. The computer program product of claim 3, wherein the data entities comprise at least one of volumes, logical unit numbers, logical devices, logical subsystems, data sets, extents of data, data objects, and databases.

5. The computer program product of claim 1, wherein the monitored I/O activity comprises a write access, wherein the last access time comprises a last write timestamp, wherein the condition is satisfied in response to the difference exceeding a threshold.

6. The computer program product of claim 1, wherein the monitored I/O activity comprises a read access, wherein the last access time comprises a last read timestamp, wherein the condition is satisfied in response to the difference exceeding a threshold.

7. The computer program product of claim 1, wherein the operations further comprise:
  determining whether the monitored I/O activity comprises a read or write access,
  wherein the determining the last access time the data subject to the monitored I/O activity was last accessed comprises determining a last read timestamp in response to determining that the monitored I/O activity comprises a read access and determining a last write timestamp in response to determining that the monitored I/O activity comprises a write access, and
  wherein the determining whether the difference of a process access time and the last access time for the data satisfies the condition comprises determining whether a difference of the process access time and the last read timestamp exceeds a read threshold in response to determining that the monitored I/O activity comprises the read access and determining whether a difference of the process access time and the last write timestamp exceeds a write threshold in response to determining that the monitored I/O activity comprises the write access.

8. The computer program product of claim 1, wherein the operations further comprise:
  determining whether a processing rate of the I/O activity exceeds a historical I/O activity toward the data by a threshold, wherein the process is characterized as the suspicious process in response to determining that the condition is satisfied and the processing rate of the I/O activity exceeds the historical I/O activity toward the data by a threshold.

9. A system detecting a security breach in a system managing access to a storage, comprising:
  a processor; and
  a computer readable storage medium having computer readable program code that when executed by the processor performs operations, the operations comprising:
    monitoring Input/Output (I/O) activity by a process accessing data in a storage;
    determining a last access time the data subject to the monitored I/O activity was last accessed prior to being accessed by the monitored I/O activity;
    determining whether a difference of a process access time the monitored I/O activity accessed the data and the last access time for the data satisfies a condition;
    characterizing the process as a suspicious process in response to determining that the condition is satisfied; and
    indicating a security breach in response to characterizing the process as the suspicious process.

10. The system of claim 9, wherein the condition comprises determining whether the difference exceeds a threshold, wherein the process is characterized as the suspicious process if the difference exceeds the threshold.

11. The system of claim 9, wherein the monitoring is performed with respect to a plurality of data entities in the storage, wherein the operations further comprise:
  storing, for the data entities, last access times the data entities were last accessed, wherein the determined last access time comprises a last access time for a data entity to which the monitored I/O activity is directed.

12. The system of claim 11, wherein the data entities comprise at least one of volumes, logical unit numbers, logical devices, logical subsystems, data sets, extents of data, data objects, and databases.

13. The system of claim 9, wherein the monitored I/O activity comprises a write access, wherein the last access time comprises a last write timestamp, wherein the condition is satisfied in response to the difference exceeding a threshold.

14. The system of claim 9, wherein the monitored I/O activity comprises a read access, wherein the last access time comprises a last read timestamp, wherein the condition is satisfied in response to the difference exceeding a threshold.

15. The system of claim 9, wherein the operations further comprise:
  determining whether the monitored I/O activity comprises a read or write access,
  wherein the determining the last access time the data subject to the monitored I/O activity was last accessed comprises determining a last read timestamp in response to determining that the monitored I/O activity comprises a read access and determining a last write timestamp in response to determining that the monitored I/O activity comprises a write access, and
  wherein the determining whether the difference of a process access time and the last access time for the data satisfies the condition comprises determining whether a difference of the process access time and the last read timestamp exceeds a read threshold in response to determining that the monitored I/O activity comprises the read access and determining whether a difference of the process access time and the last write timestamp exceeds a write threshold in response to determining that the monitored I/O activity comprises the write access.

16. The system of claim 9, wherein the operations further comprise:
  determining whether a processing rate of the I/O activity exceeds a historical I/O activity toward the data by a threshold, wherein the process is characterized as the suspicious process in response to determining that the condition is satisfied and the processing rate of the I/O activity exceeds the historical I/O activity toward the data by a threshold.

17. A method for detecting a security breach in a system managing access to a storage, comprising:
  monitoring Input/Output (I/O) activity by a process accessing data in a storage;
  determining a last access time the data subject to the monitored I/O activity was last accessed prior to being accessed by the monitored I/O activity;
  determining whether a difference of a process access time the monitored I/O activity accessed the data and the last access time for the data satisfies a condition;
  characterizing the process as a suspicious process in response to determining that the condition is satisfied; and
  indicating a security breach in response to characterizing the process as the suspicious process.

18. The method of claim 17, wherein the monitoring is performed with respect to a plurality of data entities in the storage, further comprising:
  storing, for the data entities, last access times the data entities were last accessed, wherein the determined last access time comprises a last access time for a data entity to which the monitored I/O activity is directed.

19. The method of claim 17, further comprising:
  determining whether the monitored I/O activity comprises a read or write access,
  wherein the determining the last access time the data subject to the monitored I/O activity was last accessed comprises determining a last read timestamp in response to determining that the monitored I/O activity comprises a read access and determining a last write timestamp in response to determining that the monitored I/O activity comprises a write access, and wherein the determining whether the difference of a process access time and the last access time for the data satisfies the condition comprises determining whether a difference of the process access time and the last read timestamp exceeds a read threshold in response to determining that the monitored I/O activity comprises the read access and determining whether a difference of the process access time and the last write timestamp exceeds a write threshold in response to determining that the monitored I/O activity comprises the write access.

20. The method of claim 17, further comprising:

determining whether a processing rate of the I/O activity exceeds a historical I/O activity toward the data by a threshold, wherein the process is characterized as the suspicious process in response to determining that the condition is satisfied and the processing rate of the I/O activity exceeds the historical I/O activity toward the data by a threshold.

\* \* \* \* \*